Patented June 14, 1938

2,120,557

UNITED STATES PATENT OFFICE 2,120,557

SULPHONIC ACIDS OF CARBOXYLIC ACID AMIDES AND PROCESS FOR THE PRODUCTION THEREOF

Hans Haussmann, Mannheim, Germany, assignor to I. G. Farbenindustrie Aktiengesellschaft, Frankfort-on-the-Main, Germany No Drawing. Application May 6, 1936, Serial No. 78,196. In Germany May 16, 1935

20 Claims. (Cl. 260—124)

The present invention relates to a process for the production of sulphonic acids of carboxylic acid amides which are suitable as assistants in the textile and related industries.

I have found that especially valuable washing, wetting, cleansing, dispersing and like agents are obtained by condensing halogen-containing aliphatic carboxylic acids or their derivatives, such as halides, anhydrides or esters, with amino sulphonic acids the amino groups of which still contain at least one replaceable hydrogen atom and the sulphonic group of which is combined to an aromatic radicle. In the present case the term aliphatic carboxylic acid is intended to comprise open chain as well as cycloaliphatic carboxylic acids.

Suitable halogenated carboxylic acids or carboxylic acid derivatives for the process according to this invention are in particular the halogenated chloride of saturated or unsaturated fatty acids from naturally-occurring fatty acid containing substances for example oils, fats, waxes or resins, such as coconut oil, palm kernel oil, olive oil, soy bean oil, castor oil, hydrogenated train oil (which may still contain unsaturated acids), tallow or Montan wax or colophony. Products which contain fatty acid radicles having a long carbon chain in the molecule have a specially good action. The degree of halogenation may be of any desired value depending on the nature of the condensation products and the purpose for which they are to be employed. Generally speaking it is advantageous when employing fatty acids of high molecular weight to introduce up to two or more atoms of halogen into the aliphatic or cycloaliphatic radicle of the carboxylic acid; when employing carboxylic acids of low molecular weight, a smaller content of halogen is frequently sufficient in order to obtain products having valuable properties. When employing fatty acid mixtures as the initial material it is sometimes sufficient to halogenate only a part of the fatty acids.

Instead of simple aliphatic carboxylic acids or their derivatives, substituted carboxylic acids or their derivatives may be employed or also carboxylic acids which contain hetero atoms, such as oxygen or sulphur, or hetero-atomic groups, such as carboxylic amide groups, in the aliphatic radicles. Carboxylic acids having branched chains and the like may also be employed for the process according to this invention; for example carboxylic acids obtainable by the oxidation of paraffin wax and the like, and also resin acids, bile acids and naphthenic acids may be employed.

The conversion of the said initial materials into halogenated carboxylic acids or their conversion products, such as fatty acid chlorides, may be effected by known methods; when introducing halogen into saturated initial materials, the reaction may be accelerated by increasing the temperature, by the action of light or by the addition of catalysts. Unsaturated carboxylic acids generally speaking absorb the necessary amounts of halogen under very mild conditions.

As amino-sulphonic acids having aromatically-combined sulphonic groups may be mentioned in particular the aromatic amino-sulphonic acids, as for example sulphanilic acid, metanilic acid, N-ethyl-metanilic acid, ortho-aminobenzene sulphonic acid, toluidine sulphonic acids and naphthylaminosulphonic acids as well as their derivatives or substitution products. In many cases those amino-sulphonic acids the nitrogen atoms of which only contain one replaceable hydrogen atom and the second hydrogen atoms of which are replaced by aromatic, aliphatic, cycloaliphatic, aliphatic-aromatic or heterocyclic radicles are especially valuable. Polynuclear amino-sulphonic acids of the said kind may also be employed in the same way and also amino-sulphonic acids which still contain hydroxy, carboxylic, ether, ester or nitro groups or which are substituted by halogen atoms. Amino-sulphonic acids which contain two or more basic groups of which at least one contains a replaceable hydrogen atom, or which contain two or more sulphonic groups are also suitable for the process according to this invention. For example dimethyl-para-phenylenediamine sulphonic acid, naphthylaminedisulphonic acids and naphthylamine-trisulphonic acids may be mentioned. The amino-sulphonic acids to be employed according to this invention may also be interrupted in the chains or between aromatic rings or both by hetero atoms or atomic groups. The amino groups may also have a purely aliphatic character, as for example in benzylamine sulphonic acid or in compounds of the composition:

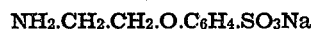

$NH_2.CH_2.CH_2.O.C_6H_4.SO_3Na$

The said interruption may occur in any desired manner, as for example by oxygen or sulphur atoms or by carboxylic amide groups or other atomic groups or also by tertiary nitrogen atoms.

The reaction of the halogenated fatty acid derivatives with the amino-sulphonic acids containing aromatic sulphonic groups may be carried out under the working conditions usual for the Schotten-Baumann reaction is so far as acid chlorides and acid anhydrides are employed. In this case, the condensation may also be carried out in organic solvents with an addition of agents combining with acids. In the reaction of fatty acids or fatty acid esters with amino-sulphonic acids or their salts it is preferable to work in the presence of organic solvents; butanol for example is suitable for this purpose. It is preferable to employ salts of the amino-sulphonic acids which are soluble in organic solvents, as for example those of tertiary bases, such as triethylamine or dimethylaniline; pyridine may also be employed in many cases. In some cases the said bases themselves are suitable as solvents.

The products obtained in the said manner have an excellent washing power for substances of all kinds. They have a high stability when employed in hard water; when the content of halogen is sufficient, their aqueous solutions give no deposits in the cold even in very hard water. By reason of their valuable properties they may be employed in a very general and varied manner and they are especially suitable for all domestic and industrial purposes. They may also frequently be employed for the production of preparations. Since they also have an excellent dispersing power for liquid and solid substances, it is possible for example to convert large amounts of solvents, oils, fats and waxes into aqueous solutions with their aid. The said products may also be employed together with other substances; among these may be mentioned for example inorganic salts, such as waterglass, Glauber's salt, perborates, ortho-, pyro- and meta-phosphates, organic salts, such as soaps, sodium salts of tetrahydronaphthalene sulphonic acids or Turkey red oils, or other wetting and cleansing agents, as for example salts of fatty alcohol sulphuric esters or true aliphatic sulphonic acids. Organic substances of a colloidal nature are also suitable as additions, as for example glue, starch, tragacanth, reaction products of ethylene oxide on organic compounds which contain reactive hydrogen atoms, as for example in the form of hydroxy, carboxyl amino or mercapto groups, and also fillers, such as clay, china clay and bentonite may be employed with the said products. Mixtures of the said products with disinfecting or pharmaceutical substances can be prepared to a greater extent than in the case of soaps.

The products according to this invention may be converted into all the forms known for the use of soaps. In particular, flakes, threads, cuttings, coarse and fine powders, solid pieces, such as hand and grained soap, or concentrated solutions, as for example liquid soaps may be prepared therefrom. Generally speaking the sodium salts of the said products are most suitable for the said purposes, but the other alkali salts and in particular the salts with ammonia or water-soluble organic bases, as for example hydroxyalkylamines, are distinguished by an excellent activity.

The following examples will further illustrate the nature of this invention but the invention is not restricted to these examples. The parts are by weight.

*Example 1*

Chlorine is led into 300 parts of stearic acid chloride at a temperature of 90° C. until an absorption of 50 parts has taken place. The resulting chlorination product is freed from dissolved hydrochloric acid by leading in air and then introduced at a temperature of zero C. into a solution of 173 parts of metanilic acid rendered alkaline with sodium carbonate. The mixture is stirred for some time at ordinary temperature and the resulting paste is evaporated to dryness. A very active washing agent is obtained which is stable in hard water.

Instead of metanilic acid also N-ethyl metanilic acid can be employed; in this manner a product is obtained which possesses a high washing power.

*Example 2*

Chlorine is led into 200 parts of coconut oil fatty acid chloride at about 90° C. until an increase in weight of 40 parts has taken place. The resulting acid chloride is condensed in the manner described in Example 1 with 223 parts of naphthionic acid and worked up. A product is obtained which has in particular a very good emulsifying power.

*Example 3*

70 parts of chlorine are led into 300 parts of oleic acid chloride while cooling with ice. The resulting product is reacted with 300 parts of an amino-sulphonic acid having the formula:

$$CH_3.NH.CH_2.CH_2.O.C_6H_4.SO_3Na$$

at a temperature of from 25° to 30° C., the reaction being alkaline to phenolphthalein and being kept so by the addition of corresponding amounts of caustic soda solution. When the reaction is completed, the reaction mixture is heated for some time at from 45° to 50° C., neutralized and evaporated to dryness. A product is obtained which is eminently suitable especially for dispersing calcium soaps.

What I claim is:—

1. The process for the production of amides which comprises condensing an aliphatic carboxylic acid substance selected from the class consisting of carboxylic acids, carboxylic halides, anhydrides and esters, containing outside the carboxylic group at least one halogen atom with an aromatic amino sulphonic acid the amino group of which contains at least one replaceable hydrogen atom and the sulphonic group of which is attached to an aromatic nucleus.

2. The process for the production of amides which comprises condensing a soap-forming aliphatic carboxylic acid substance selected from the class consisting of carboxylic acids, carboxylic halides, anhydrides and esters, containing outside the carboxylic group at least one halogen atom with an aromatic amino sulphonic acid the amino group of which contains at least one replaceable hydrogen atom and the sulphonic group of which is attached to an aromatic nucleus.

3. The process for the production of amides which comprises condensing a halogen-containing aliphatic acid obtainable from high molecular organic substances of natural origin with an aromatic amino sulphonic acid the amino group of which contains at least one replaceable hydrogen atom and the sulphonic group of which is attached to an aromatic nucleus.

4. The process for the production of amides which comprises condensing a derivative of an aliphatic carboxylic acid selected from the class consisting of carboxylic halogenides, anhydrides and esters, containing outside the carboxylic groups at least one halogen atom with an aromatic amino sulphonic acid the amino group of which contains at least one replaceable hydrogen atom and the sulphonic group of which is attached to an aromatic nucleus.

5. The process for the production of amides which comprises condensing a halogen-containing hydrogenated fatty acid obtained from unsaturated fatty acids with an aromatic amino sulphonic acid the amino group of which contains at least one replaceable hydrogen atom and the sulphonic group of which is attached to an aromatic nucleus.

6. The process for the production of amides which comprises condensing a halogen-containing hydrogenated train oil fatty acid with an aromatic amino sulphonic acid the amino group of which contains at least one replaceable hydrogen atom and the sulphonic group of which is attached to an aromatic nucleus.

7. The process for the production of amides which comprises condensing a soap-forming aliphatic carboxylic acid substance selected from the class consisting of carboxylic acids, carboxylic halides, anhydrides and esters, containing outside the carboxylic group at least one halogen atom with an aromatic amino mono sulphonic acid the amino group of which contains at least one replaceable hydrogen atom and the sulphonic group of which is attached to an aromatic nucleus.

8. The process for the production of amides which comprises condensing a soap-forming aliphatic carboxylic acid substance selected from the class consisting of carboxylic acids, carboxylic halides, anhydrides and esters, containing outside the carboxylic group at least one halogen atom with a mono nuclear amino mono sulphonic acid the amino group of which contains at least one replaceable hydrogen atom and the sulphonic group of which is attached to the nucleus.

9. The process for the production of amides which comprises condensing a soap forming aliphatic carboxylic acid substance selected from the class consisting of carboxylic acids, carboxylic halides, anhydrides and esters, containing outside the carboxylic group at least one halogen atom with metanilic acid.

10. The process for the production of amides which comprises condensing a soap-forming aliphatic carboxylic acid substance selected from the class consisting of carboxylic acids, carboxylic halides, anhydrides and esters, containing outside the carboxylic group at least one halogen atom. with an amino sulphonic acid containing at least one alkyl radicle and the amino group of which contains at least one replaceable hydrogen atom and the sulphonic group of which is attached to an aromatic radicle.

11. The process for the production of amides which comprises condensing a halogen-containing soap-forming aliphatic carboxylic acid substance selected from the class consisting of carboxylic acids, carboxylic halides, anhydrides and esters, containing outside the carboxylic group at least one halogen atom with a toluidine sulphonic acid.

12. A colorless carboxylic acid amide derived from a halogen-containing aliphatic carboxylic acid with at least eight carbon atoms containing in the amino radicle at least one aromatic radicle and at least one sulphonic group attached to the aromatic radicle.

13. A colorless amide of a halogenated soap-forming acid containing in the amino radicle at least one aromatic radicle and at least one sulphonic group attached to the aromatic radicle.

14. A colorless amide of a halogenated soap-forming acid containing in the amino radicle at least one mono-nuclear aromatic radicle and at least one sulphonic group attached to the aromatic radicle.

15. A colorless amide of a halogenated soap forming acid and metanilic acid.

16. A colorless amide of a halogenated soap-forming acid and amino-sulphonic acids containing in the amino radicle at least one aromatic radicle and at least one alkyl radicle and a sulphonic group attached to the aromatic radicle.

17. A colorless amide of a halogen-containing soap-forming acid and —N-ethyl metanilic acid.

18. A colorless amide of a halogen-containing soap-forming acid and toluidine sulphonic acid.

19. A colorless amide of halogen-containing hydrogenated train oil fatty acids and metanilic acid.

20. A colorless amide of halogen-containing hydrogenated train oil fatty acids and toluidine sulphonic acid.

HANS HAUSSMANN.